(12) United States Patent
Wang et al.

(10) Patent No.: US 10,349,003 B2
(45) Date of Patent: Jul. 9, 2019

(54) VIDEO RECORDING SYSTEM, SERVER, SYSTEM, AND STORAGE MEDIUM

(71) Applicant: PING AN TECHNOLOGY (SHENZHEN) CO., LTD., Shenzhen (CN)

(72) Inventors: Jianzong Wang, Shenzhen (CN); Leihao Xia, Shenzhen (CN); Jin Ma, Shenzhen (CN); Ming Liu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/737,323

(22) PCT Filed: Apr. 11, 2017

(86) PCT No.: PCT/CN2017/080113
§ 371 (c)(1),
(2) Date: Dec. 18, 2017

(87) PCT Pub. No.: WO2017/177902
PCT Pub. Date: Oct. 19, 2017

(65) Prior Publication Data
US 2018/0227538 A1      Aug. 9, 2018

(30) Foreign Application Priority Data

Apr. 14, 2016   (CN) .......................... 2016 1 0234956

(51) Int. Cl.
*H04N 5/91*      (2006.01)
*G06T 7/254*    (2017.01)
(Continued)

(52) U.S. Cl.
CPC ........... *H04N 5/91* (2013.01); *G06K 9/00771* (2013.01); *G06T 7/20* (2013.01); *G06T 7/254* (2017.01);
(Continued)

(58) Field of Classification Search
None
See application file for complete search history.

(56) References Cited

U.S. PATENT DOCUMENTS

2008/0100704 A1* 5/2008 Venetianer .......... G06F 17/3079
348/143
2013/0201338 A1 8/2013 Westmacott et al.
(Continued)

FOREIGN PATENT DOCUMENTS

CN     101017573 A     8/2007
CN     104270619 A     1/2015
(Continued)

*Primary Examiner* — Chikaodili E Anyikire
(74) *Attorney, Agent, or Firm* — Gokalp Bayramoglu (57) ABSTRACT

A video recording method is disclosed including: extracting every predetermined time period a first image captured by a monitoring camera; performing region detection on the first image to extract areas of interest covering some or all parts of a target object; performing motion area filtering on the areas of interest to select one or more target areas; dividing each target area into multiple sub-areas; extracting every predetermined time period a second image captured by the monitoring camera; comparing an image block located in each sub-area of the second image with that in the same sub-area of the second image previously extracted, to determine whether a motion event has occurred in each sub-area; and controlling the monitoring camera to start video recording from the currently extracted second image when a (Continued)

motion event has occurred in a sub-area. A server, system, and storage medium suitable for the method are also disclosed.

13 Claims, 4 Drawing Sheets

(51) Int. Cl.
*H04N 5/76* (2006.01)
*G06K 9/00* (2006.01)
*G06T 7/20* (2017.01)

(52) U.S. Cl.
CPC ..... *H04N 5/76* (2013.01); *G06K 2009/00738* (2013.01); *G06T 2207/10016* (2013.01); *G06T 2207/20021* (2013.01); *G06T 2207/20081* (2013.01); *G06T 2207/20084* (2013.01); *G06T 2207/30232* (2013.01)

(56) References Cited

U.S. PATENT DOCUMENTS

| | | | |
|---|---|---|---|
| 2015/0269143 A1* | 9/2015 | Park | G06F 17/301 382/305 |
| 2017/0060254 A1* | 3/2017 | Molchanov | G06F 3/011 |
| 2017/0076195 A1* | 3/2017 | Yang | G06N 3/063 |
| 2018/0181593 A1* | 6/2018 | Ranzinger | G06K 9/6203 |

FOREIGN PATENT DOCUMENTS

| | | |
|---|---|---|
| CN | 104601918 A | 5/2015 |
| CN | 105279898 A | 1/2016 |
| CN | 106027931 A | 10/2016 |

* cited by examiner

VIDEO RECORDING SYSTEM, SERVER, SYSTEM, AND STORAGE MEDIUM

CROSS-REFERENCE TO RELATED APPLICATIONS

This application is the National Stage of International Application No. PCT/CN2017/080113, filed on Apr. 11, 2017, which claims the benefit of priority from Chinese Patent Application No. 201610234956.7, filed on Apr. 14, 2016 and entitled "Video Recording Method and Server", the entire content of which is incorporated herein by reference.

TECHNICAL FIELD

This disclosure relates in general to the field of video processing techniques, and more particularly relates to a video recording method, server, system, and storage medium.

BACKGROUND

During the course of the car being repaired in the repair shop, the monitoring system will keep performing image recording all day long. So image recording would be uninterrupted even when the car is not being repaired, producing a high number of static video frames. Preserving a large number of such static video frames can result in wasted storage space and network bandwidth. In addition, to view and retrieve the key information would entail searching among the static video frames spanning a long length of time, resulting in a waste of time and efforts or even missing the key frame.

Existing video recording methods monitor the panorama and only trigger the recording action when a motion occurs. Such a function can, to some extent, alleviate the above issues. But the drawback is an irrelevant movement would also trigger the recording action. For example, when a pedestrian is walking by the car 5 meters away, the video recording will inexorably be triggered by the movement, still leading to information redundancy.

SUMMARY

In view of the above, the present application provides a video recording method, server, system, and storage medium, which can reduce the recording of unnecessary video frames.

The video recording method provided by this application includes the following steps.

A first image captured by a monitoring camera is extracted every first predetermined time period. A pre-established model is used to perform region detection on the extracted first image to extract areas of interest covering some or all parts of a target object. Motion area filtering is then performed on the areas of interest using an analysis rule to select one or more target areas. The selected target areas are then divided according to a division rule so that each target area is divided into multiple sub-areas. Then a second image captured by the monitoring camera is extracted every second predetermined time period. The image block located in each sub-area of the second image is compared with that in the same sub-area of the second image previously extracted, so as to determine whether or not a motion event has occurred in each sub-area. If a motion event has occurred in a sub-area, then the monitoring camera is controlled to start video recording from the currently extracted second image.

The server provided by this application may include a storage device and a processor. The storage device can be used to store a video recording system. The processor can be used to invoke and execute the video recording system to perform the following operations:

extracting a first image captured by a monitoring camera every first predetermined time period;

performing region detection on the extracted first image using a pre-established model to extract areas of interest covering some or all parts of a target object;

performing motion area filtering on the areas of interest using an analysis rule to select one or more target areas;

dividing the selected target areas according to a division rule so that each target area is divided into multiple sub-areas;

extracting a second image captured by the monitoring camera every second predetermined time period;

comparing the image block located in each sub-area of the second image with that in the same sub-area of the second image previously extracted, to determine whether or not a motion event has occurred in each sub-area; and controlling the monitoring camera to start video recording from the currently extracted second image when a motion event has occurred in a sub-area.

The video recording system provided by this application may include: a first image acquisition module that extracts a first image captured by a monitoring camera every first predetermined time period; a modeling module that performs region detection on the extracted first image using a pre-established model to extract areas of interest covering some or all parts of a target object; a filtering module that performs motion area filtering on the extracted areas of interest using an analysis rule to select one or more target areas; a division module that divides the selected target areas according to a division rule so that each target area is divided into multiple sub-areas; a second image acquisition module that extracts a second image captured by the monitoring camera every second predetermined time period; a motion detection module that compares the image block located in each sub-area of the second image with that in the same sub-area of the second image previously extracted, to determine whether or not a motion event has occurred in each sub-area; and a video recording module that controls the monitoring camera to start video recording from the currently extracted second image when a motion event has occurred in a sub-area.

This application also provides a non-volatile storage medium storing computer-readable instructions that, when executed by one or more processors, perform the following operations:

extracting a first image captured by a monitoring camera every first predetermined time period;

performing region detection on the extracted first image using a pre-established model to extract areas of interest covering some or all parts of a target object;

performing motion area filtering on the extracted areas of interest using an analysis rule to select one or more target areas;

dividing the selected target areas according to a division rule so that each selected target area is divided into multiple sub-areas;

extracting a second image captured by the monitoring camera every second predetermined time period;

comparing the image block located in each sub-area of the second image with that in the same sub-area of the second image previously extracted, to determine whether or not a motion event has occurred in each sub-area; and controlling the monitoring camera to start video recording from the currently extracted second image when a motion event has occurred in a sub-area.

By the video recording method as well as the server, system, and storage medium suitable for use with the video recording method, the recording of unnecessary video frames can be reduced, so are the waste of storage space and network bandwidth.

DETAILED DESCRIPTION OF THE INVENTION

Figure 1:
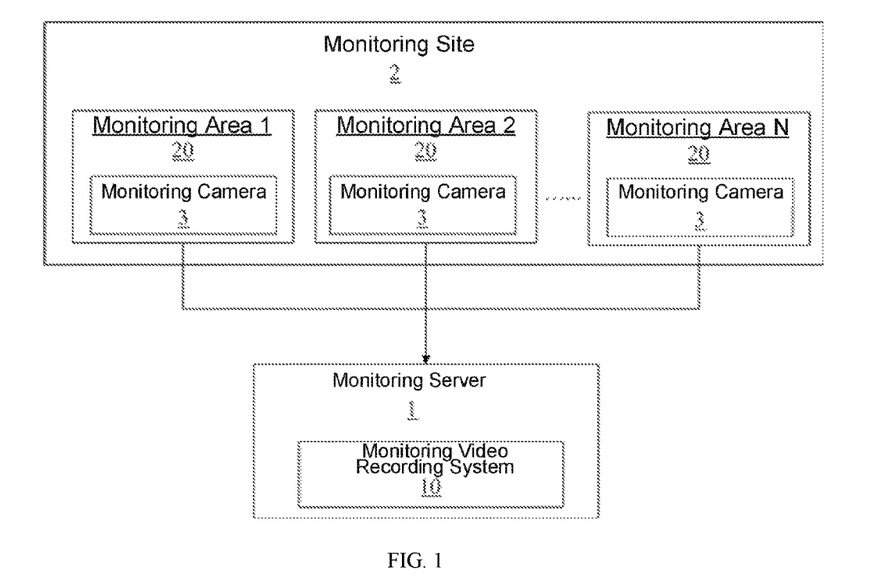
FIG. 1 is a schematic diagram illustrating a server application environment of a first exemplary embodiment of a video recording system according to this application.

FIG. 1 shows a schematic diagram illustrating a server application environment of a first exemplary embodiment of a video recording system according to this application.

In this embodiment, a video recording system 10 may be installed and operate in a server. The server may be a monitoring server 1, as illustrated in FIG. 1. The monitoring server 1 may be communicatively coupled to one or more monitoring cameras 3 installed in a monitoring site 2 through a communication module (not shown).

The monitoring site 2 may be a place having many people, such as schools, kindergartens, shopping malls, hospitals, parks, city squares, underground pedestrian passageways, or other special areas demanding monitoring installations, such as households, small supermarkets, automatic teller machines (ATMs). In this embodiment the monitoring site 2 is an automobile repair shop, e.g., a 4S shop.

The monitoring cameras 3 may be installed in the monitoring site 2. Each monitoring camera 3 may be an analog camera. Analog camera may convert an analog video signal generated by a video capture device into a digital signal using a specific video capture card, transmit the digital signal, and store the digital signal in the monitoring server 1. In this embodiment the monitoring camera 3 is a network camera. After the network camera is mounted, it may be coupled to a router via a network cable, thus being communicatively connected to the monitoring server 1 through the router. The monitoring server 1 may be used to perform video outputting.

The monitoring server 1 may include a processor and a storage device (not shown). The processor may include a core unit and a control unit for interpreting computer instructions and processing the data in computer software. The storage device may store a database, an operating system and the video recording system 10 described above. In some embodiments, the storage device includes an internal memory and a non-volatile storage medium. The video recording system, the operating system, and the database may be stored in the non-volatile storage medium, while the internal memory may furnish a cached operating environment for the operating system, the database, and the video recording system 10.

In this embodiment, the video recording system 10 includes at least one computer-executable program instruction that can be executed by the processor to perform the following operations.

A first image captured by the monitoring camera 3 is extracted every first predetermined time period, e.g., every 5 minutes. A pre-established model is used to perform region detection on the extracted first image to extract areas of interest covering some or all parts of a target object, e.g., a car. Motion area filtering is then performed on the extracted areas of interest using an analysis rule thus deriving one or more target areas. Each of the selected target area is then divided into multiple sub-areas according to a division rule. A second image captured by the monitoring camera 3 is then extracted every second predetermined time period, e.g., 0.5 seconds. Then the image block in each sub-area of the second image is compared with that in the same sub-area of the previously extracted second image, so as to determine whether a motion event has occurred in each sub-area. When a motion event occurs in a sub-area, the monitoring camera 3 is controlled to start video recording from the currently extracted second image.

The pre-established model may be a convolutional neural network (CNN) model.

The model may be created by the following steps.

A predetermined number (e.g., 100,000 pieces) of repair workstation images collected by the monitoring equipment installed at various vehicle repair workstations can be acquired from the databases of a variety of vehicle repair shops. Since there are already numerous monitoring videos currently in the repair shops, in this embodiment dynamic videos can be selected from thereamong and key frames extracted to obtain a large number of images. For each of the collected photos, the area in which the vehicle is located can be marked, where a rectangular box may be used to mark the vehicle location and annotations made. This process can be carried out in the form of crowdsourcing or manual marking by people within the company. The marked area where the vehicle is located is the area of interest. A predetermined number of images marked with the area in which the vehicle is located can be used to train a CNN model of a preset model structure, thus generating a CNN model for recognizing the area of interest in the image. The purpose of training is to optimize the values of various weights within the CNN network so that the network model as a whole can practically be better applied to the recognition of the areas of interest. The network model may have a total of seven layers, including five convolutional layers, one downsampling layer, and one fully connected layer. Among these layers, each convolutional layer is formed by many feature maps constructed out of feature vectors, where the feature maps serve the function of extracting key features using convolution filters. The downsampling layer serves to remove the repeatedly expressed feature points by sampling, so as to reduce the number of features extracted and improve the efficiency of data communication between networks. The available sampling methods may include maximum sampling, average sampling, and random sampling. The fully connected layer serves to connect the previous convolutional layers with the downsampling layer, and compute a weight matrix for use in the subsequent actual classification. An image, after being inputted to the model, will be subjected to two processes, i.e., a forward iteration process and a backward iteration process, at each layer. Each iteration generates a probability distribution and then the probability distributions of multiple iterations may be combined or superposed. The system will select from among the resulting probability distribution the category with the maximum value as the final classification result.

The analysis rule may be as follows. First, whether there exists an extracted area of interest that lies within the preset pixel area or not is analyzed, e.g., the preset pixel area may include an abscissa range (X1, X2) and an ordinate range (Y1, Y2), where X1 represents the pixels in column X1, and X2 represents the pixels in column X2, with X1 being less than X2; Y1 represents the pixels in row Y1, and Y2 represents the pixels in row Y2, with Y1 being less than Y2; if there exists an area of interest that lies within the preset pixel area, then this area of interest will be determined as the target area. The principle of this analysis rule is as follows. A monitoring camera in the repair shop is generally aimed at a repair workstation to ensure that the vehicle occupies the main area of the lens, i.e., "the central area", so that the preset pixel area is supposed to cover the main area of the lens as much as possible. This area, however, should neither be too large in order to prevent multiple areas of interest from falling therein, nor should it be too narrow in order to prevent it from being difficult for an area of interest to fall therein. The range of the abscissa area and the range of the ordinate area can be verified by manual means. If too large, the ranges of the abscissa area and the ordinate area can be tuned down, otherwise if too narrow, they can be tuned up.

The division rule may be such that the target areas may be divided into sub-areas in a uniform division manner, i.e., the resulting divided sub-areas are uniform in their size and shape. In such a manner, each of the target areas can be divided into a number of N times N sub-areas, where N is a positive integer larger than 1, e.g., 8*8. There are two main considerations for using N*N sub-areas rather than the overall target for motion detection. First is accuracy. If pixel value comparison is performed for just the whole target, then a relatively small action may be averaged out by other static parts, resulting in such a subtle action being unable to detect. Second is efficiency. Maybe an action occurs in just one area, so that as long as the action is detected in this sub-area, this frame can be saved, rendering it unnecessary to continue to detect other parts. For example, take 8*8 sub-areas for example, if an action or movement is detected in the first sub-area, then it would become needless to detect the remaining 63 sub-areas, increasing the efficiency 64 times.

In determining whether a motion event has occurred in each sub-area, the pixel value of each pixel in the image block located in each sub-area of the currently extracted second image is compared with that of the corresponding pixel in the image block situated in the same sub-area of the previously extracted second image, to compute a difference value therebetween. All the corresponding difference values of the image block in each sub-area are summed and the summation thus computed is divided by the number of pixels in this image block to obtain the corresponding average difference value of the image block in each sub-area. As such, if there exists a sub-area in which the image block is associated with an average difference value larger than the predetermined threshold value, then it can be determined that a motion event has occurred in this sub-area.

Figure 2:
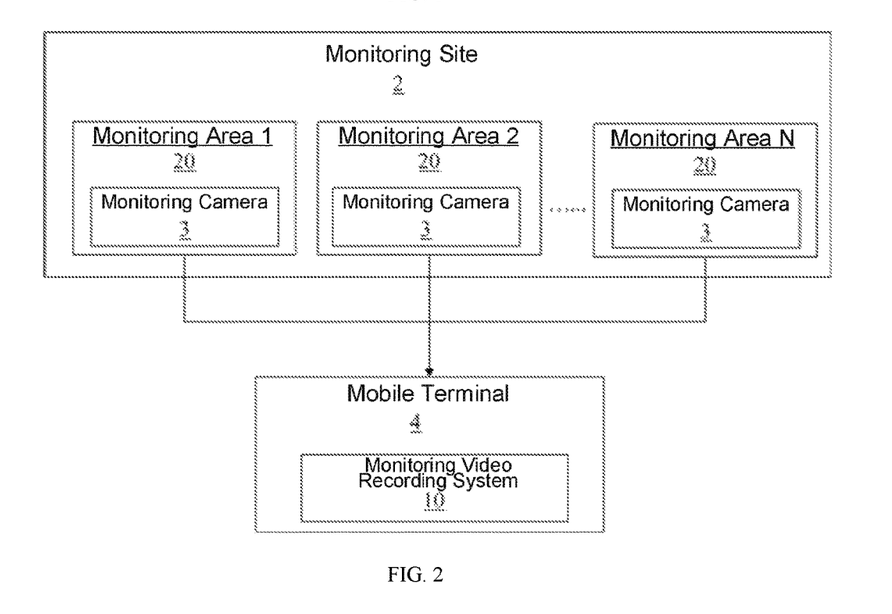
FIG. 2 is a schematic diagram illustrating a terminal application environment of a second exemplary embodiment of a video recording system according to this application.

In other exemplary embodiments of the disclosure, the video recording system 10 can also be installed and run in any terminal device, e.g., a mobile terminal 4 illustrated in FIG. 2. The mobile terminal 4 may be any electronic device equipped with a certain data processing functionality, such as a smartphone, a tablet computer, a notebook computer, a wearable watch, wearable eyeglasses, or the like. Similarly, the terminal device 2 may also include a processor and a storage device (not shown). The above-mentioned video recording system 10 may include at least one computer-executable program instruction that is stored in the storage device of the terminal device 2, and that can be executed by the processor of the terminal device 2 to perform the operations described in the above embodiment 1.

It will be appreciated by those skilled in the art that the constructions as illustrated in FIGS. 1 and 2 are merely block diagrams of part of the constructions related to the solutions of the present application, but will not constitute limitations to the server or terminal device entailed in the solutions of this application. In particular, the electronic device may embrace more or fewer components or parts than shown, or combine some components or parts, or employ different component arrangements.

It will be understood that the non-volatile storage medium mentioned in the above embodiments may be a non-volatile storage medium such as a magnetic disk, an optical disk, a read-only memory (ROM), etc., or a random access memory (RAM) or the like.

It will be appreciated that the storage device may be built-in or external to the monitoring server 1 or the terminal device 2.

Figure 3:
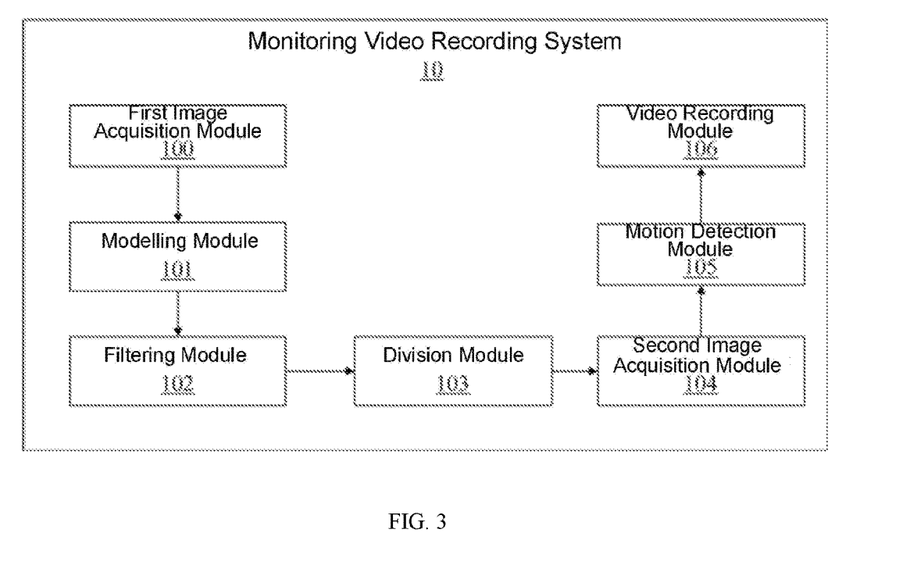
FIG. 3 is a block diagram illustrating an exemplary embodiment of a video recording system according to this application.

FIG. 3 is a block diagram illustrating an exemplary embodiment of a video recording system according to the disclosure.

The program code of the video recording system 10 can be divided into a plurality of functional modules depending on their different functions. In an exemplary embodiment of the disclosure, the video recording system 10 may include a first image acquisition module 100, a modeling module 101, a filtering module 102, a division module 103, a second image acquisition module 104, a motion detection module 105, and a video recording module 106.

The first image acquisition module 100 is configured to extract every first predetermined time period (e.g., every 5 minutes) a first image captured by monitoring camera 3.

The modeling module 101 is configured to perform region detection on the extracted first image using a pre-established model to extract areas of interest covering some or all parts of a target object, e.g., a vehicle.

The pre-established model may be a convolutional neural network (CNN) model.

The model of the preset type may be created by the following steps.

A predetermined number (e.g., 100,000 pieces) of repair workstation images collected by the monitoring equipment installed at various vehicle repair workstations can be acquired from the databases of a variety of vehicle repair shops. Since there are already numerous monitoring videos currently in the repair shops, in this embodiment dynamic videos can be selected from thereamong and key frames extracted to obtain a large number of images. For each of the collected photos, the area in which the vehicle is located can be marked, where a rectangular box may be used to mark the vehicle location and annotations made. This process can be carried out in the form of crowdsourcing or manual marking by people within the company. The marked area where the vehicle is located is the area of interest. A predetermined number of images in which the area where the vehicle is located can be used to train a CNN model of a preset model structure, thus generating a CNN model for recognizing the area of interest in the image. The purpose of training is to optimize the values of various weights within the CNN network so that the network model as a whole can practically be better applied to the recognition of the areas of interest. The network model may have a total of seven layers, including five convolutional layers, one downsampling layer, and one fully connected layer. Among these layers, each convolutional layer is formed by many feature maps constructed out of feature vectors, where the feature maps serve the function of extracting key features using convolution filters. The downsampling layer serves to remove the repeatedly expressed feature points by sampling, so as to reduce the number of features extracted and improve the efficiency of data communication between networks. The available sampling methods may include maximum sampling, average sampling, and random sampling. The fully connected layer serves to connect the previous convolutional layers with the downsampling layer, and compute a weight matrix for use in the subsequent actual classification. An image, after being inputted to the model, will be subjected to two processes, i.e., a forward iteration process and a backward iteration process, at each layer. Each iteration generates a probability distribution and then the probability distributions of multiple iterations may be combined or superposed. The system will select from among the resulting probability distribution the category with the maximum value as the final classification result.

The filtering module 102 is configured to perform motion area filtering on the areas of interest using an analysis rule to select one or more target areas.

The analysis rule may be as follows. First, whether there exists an extracted area of interest that lies within the preset pixel area or not is analyzed, e.g., the preset pixel area may include an abscissa range (X1, X2) and an ordinate range (Y1, Y2); if there exists an area of interest that lies in the preset pixel area, then this area of interest will be determined as the target area. The principle of this analysis rule is as follows. A monitoring camera in the repair shop is generally aimed at a repair workstation to ensure that the vehicle occupies the main area of the lens, i.e., "the central area", so that the preset pixel area is supposed to cover the main area of the lens as much as possible. This area, however, should neither be too large in order to prevent multiple areas of interest from falling therein, nor should it be too narrow in order to prevent it from being difficult for an area of interest to fall therein. The range of the abscissa area and the range of the ordinate area can be verified by manual means. If too large, the ranges of the abscissa area and the ordinate area can be tuned down, otherwise if too narrow, they can be tuned up.

The division module 103 is configured to divide the selected one or more target areas according to a division rule so that each of the one or more target areas is divided into multiple sub-areas.

The division rule may be such that the target areas may be divided into sub-areas in a uniform division manner, i.e., the resulting divided sub-areas are uniform in their size and shape. In such a manner, each of the target areas can be divided into a number of N times N sub-areas, where N is a positive integer larger than 1, e.g., 8*8. There are two main considerations for using N*N sub-areas rather than the overall target for motion detection. First is accuracy. If pixel value comparison is performed for just the whole target, then a relatively small action may be averaged out by other static parts, resulting in such a subtle action being unable to be detected. Second is efficiency. Maybe an action occurs in just one area, so that as long as the action is detected in this sub-area, this frame can be saved, rendering it unnecessary to continue to detect other parts. For example, take 8*8 sub-areas for example, if an action or movement is detected in the first sub-area, then it would become needless to detect the remaining 63 sub-areas, increasing the efficiency 64 times.

The second image acquisition module 104 is configured to extract every second predetermined time period (e.g., 0.5 seconds) a second image captured by monitoring camera 3.

The motion detection module 105 is configured to compare the image block located in each sub-area of the second image with that in the same sub-area of the second image previously extracted, to determine whether or not a motion event has occurred in each sub-area.

In determining whether a motion event has occurred in each sub-area, the pixel value of each pixel in the image block located in a sub-area of the currently extracted second image is compared with that of the corresponding pixel in the image block situated in the same sub-area of the previously extracted second image, to compute a difference value therebetween. All the corresponding difference values of the image block in this sub-area are summed and the summation thus computed is divided by the number of pixels in the image block to obtain the corresponding average difference value of the image block in this sub-area. As such, if there exists a sub-area in which the image block is associated with an average difference value larger than the predetermined threshold, then it can be determined that a motion event has occurred in this sub-area.

The video recording module 106 is configured to control the monitoring camera 3 to start video recording from the currently extracted second image when a motion event has occurred in a sub-area.

Figure 4:
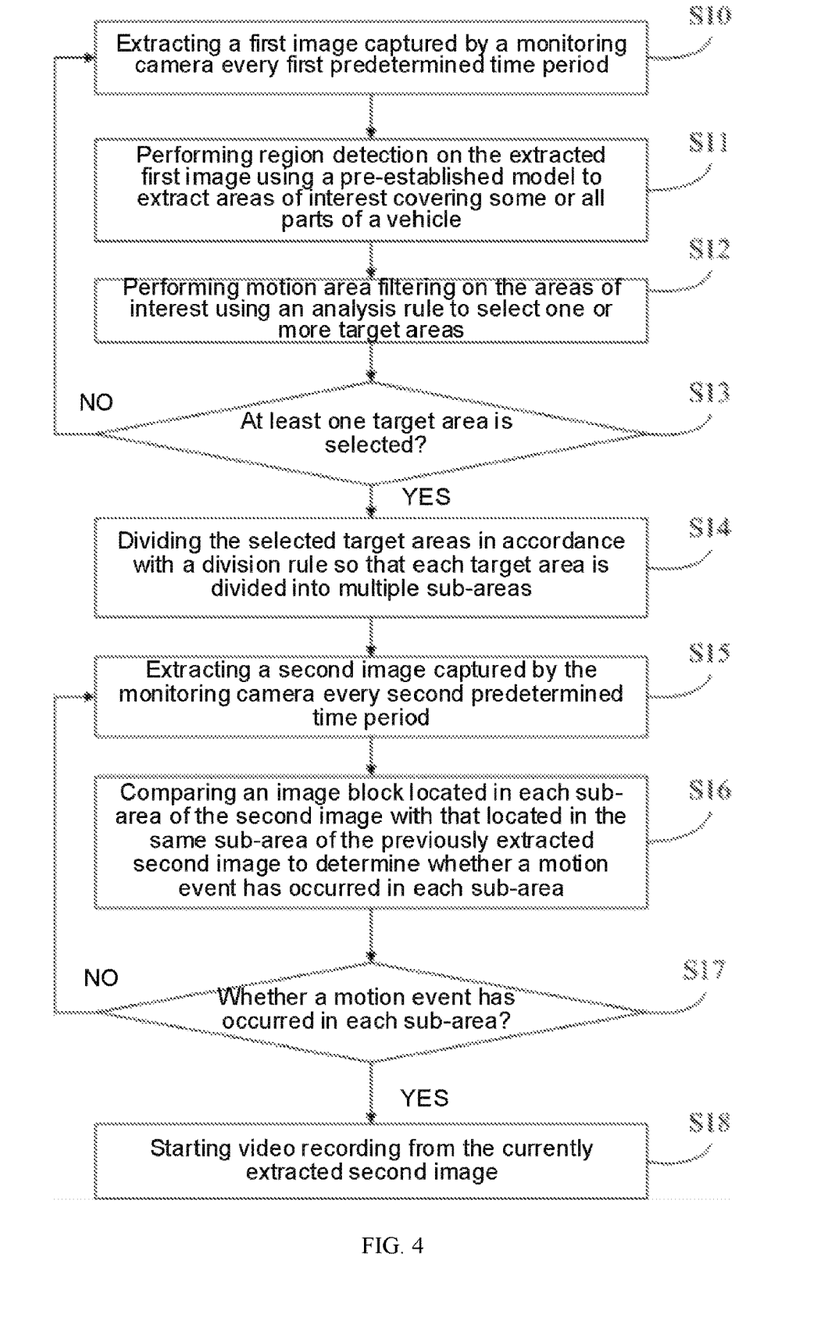
FIG. 4 is a flowchart illustrating an exemplary embodiment of a video recording method according to this application.

FIG. 4 is a flowchart illustrating an exemplary embodiment of a video recording method according to the present disclosure. The video recording method described in this embodiment will not be limited to the steps illustrated in the flowchart; and of the steps shown in the flowchart, some steps can be omitted or the order of the steps can be changed.

In a first step S10, the first image acquisition module 100 extracts every first predetermined time period (e.g., every 5 minutes) a first image captured by monitoring camera 3.

In step S11, the modeling module 101 performs region detection on the extracted first image using a pre-established model to extract area of interests covering some or all parts of a target object, e.g., a vehicle.

The pre-established model may be a convolutional neural network (CNN) model.

The model of the preset type may be created by the following steps.

A predetermined number (e.g., 100,000 pieces) of repair workstation images collected by the monitoring equipment installed at various vehicle repair workstations can be acquired from the databases of a variety of vehicle repair shops. Since there are already numerous monitoring videos currently in the repair shops, in this embodiment dynamic videos can be selected from thereamong and key frames extracted to obtain a large number of images. For each of the collected photos, the area in which the vehicle is located can be marked, where a rectangular box may be used to mark the vehicle location and annotations made. This process can be carried out in the form of crowdsourcing or manual marking by people within the company. The marked area where the vehicle is located is the area of interest. A predetermined number of images marked with the area in which the vehicle is located can be used to train a CNN model of a preset model structure, thus generating a CNN model for recognizing the area of interest in the image. The purpose of training is to optimize the values of various weights within the CNN network so that the network model as a whole can practically be better applied to the recognition of the areas of interest. The network model may have a total of seven layers, including five convolutional layers, one downsampling layer, and one fully connected layer. Among these layers, each convolutional layer is formed by many feature maps constructed out of feature vectors, where the feature maps serve the function of extracting key features using convolution filters. The downsampling layer serves to remove the repeatedly expressed feature points by sampling, so as to reduce the number of features extracted and improve the efficiency of data communication between networks. The available sampling methods may include maximum sampling, average sampling, and random sampling. The fully connected layer serves to connect the previous convolutional layers with the downsampling layer, and to compute a weight matrix for use in the subsequent actual classification. An image, after being inputted to the model, will be subjected to two processes, i.e., a forward iteration process and a backward iteration process, at each layer. Each iteration generates a probability distribution and then the probability distributions of multiple iterations may be combined or superposed. The system will select from among the resulting probability distribution the category with the maximum value as the final classification result.

In step S12, filtering module 102 performs motion area filtering on the areas of interest using an analysis rule to select one or more target areas.

The analysis rule may be as follows. First, whether there exists an extracted area of interest that lies within the preset pixel area or not is analyzed, e.g., the preset pixel area may include an abscissa range (X1, X2) and an ordinate range (Y1, Y2); if there exists an area of interest that lies in the preset pixel area, then this area of interest will be determined as the target area. The principle of this analysis rule is as follows. A monitoring camera in the repair shop is generally aimed at a repair workstation to ensure that the vehicle occupies the main area of the lens, i.e., "the central area", so that the preset pixel area is supposed to cover the main area of the lens as much as possible. This area, however, should neither be too large in order to prevent multiple areas of interest from falling therein, nor should it be too narrow in order to prevent it from being difficult for an area of interest to fall therein. The range of the abscissa area and the range of the ordinate area can be verified by manual means. If too large, the ranges of the abscissa area and the ordinate area can be tuned down; otherwise if too narrow, they can be tuned up.

In step S13, the filtering module 102 determines whether at least one target area is selected. If no target area has been selected, the method may return to the above step 10, at which the extraction of the first image is performed again. If a target area is selected, then the following step S14 would be performed.

In step S14, the division module 103 divides the selected target areas according to a division rule so that each of the selected one or more target areas is divided into multiple sub-areas.

The division rule may be such that the target areas may be divided into sub-areas in a uniform division manner, i.e., the resulting divided sub-areas are uniform in their size and shape. In such a manner, the target areas can be divided into a number of N times N sub-areas, where N is a positive integer larger than 1, e.g., 8*8. There are two main considerations for using N*N sub-areas rather than the overall target for motion detection. First is accuracy. If pixel value comparison is performed for just the whole target, then a relatively small action can be averaged out by other static parts, resulting in such a subtle action being unable to detect. Second is efficiency. Maybe an action occurs in just one area, so that as long as the action is detected in this sub-area, this frame can be saved, rendering it unnecessary to continue to detect other parts. For example, take 8*8 sub-areas for example, if an action or movement is detected in the first sub-area, then it would become needless to detect the remaining 63 sub-areas, increasing the efficiency 64 times.

In step S15, the second image acquisition module 104 extracts every second predetermined time period (e.g., 0.5 seconds) a second image captured by the monitoring camera 3.

In step S16, the motion detection module 105 compares the image block located in each sub-area of the second image with that in the same sub-area of the second image previously extracted, to determine whether or not a motion event has occurred in each sub-area. For the detailed implementation flow of step S16, see the following description in reference to FIG. 5.

In step S17, the motion detection module 105 determines whether a motion event has occurred in each sub-area. If no motion event has occurred in any sub-area, then the method may go back to the above step S15. If there is detected a motion event in any sub-area, the following step S18 will be performed.

In step S18, the video recording module 106 controls the monitoring camera 3 to start video recording from the currently extracted second image.

Figure 5:
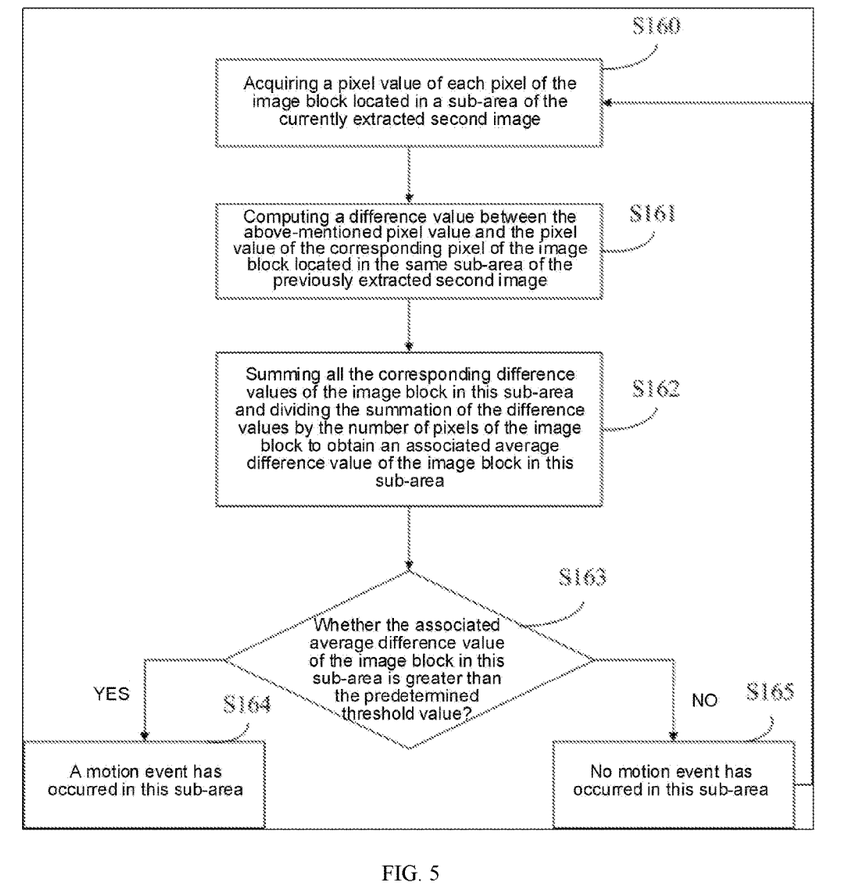
FIG. 5 is a detailed flowchart illustrating the determination of whether a motion event has occurred in each sub-area in the exemplary embodiment of the video recording method illustrated in FIG. 4.

FIG. 5 is a detailed implementation flowchart illustrating step S16 shown in FIG. 4, i.e., determining whether a motion event has occurred in each sub-area. The video recording method described in this embodiment will not be limited to the steps illustrated in the flowchart; and of the steps shown in the flowchart, some steps can be omitted or the order of the steps can be changed.

In step S160, the motion detection module 105 acquires a pixel value of each of pixels of the image block located in one sub-area of the currently extracted second image.

In step S161, the motion detection module 105 compares the pixel value of each pixel of the image block located in this sub-area of the currently extracted second image with that of the corresponding pixel of the image block located in the same sub-area of the second image previously extracted to compute a difference value therebetween.

In step S162, the motion detection module 105 sums all the corresponding difference values of the image block located in this sub-area and divides the summation by the number of pixels of this image block, to obtain a corresponding average difference value of the image block in this sub-area.

In step S163, the motion detection module 105 determines whether the corresponding average difference value of the image block in this sub-area is greater than a predetermined threshold value. If it is greater than the predetermined threshold, the following step S164 will be performed; otherwise if it is less than the predetermined threshold value, then the following step S165 will be performed.

In step S164, the motion detection module 105 determines whether a motion event has occurred in this sub-area.

In step S165, the motion detection module 105 determines no motion event has occurred in this sub-area. The method then may return to the above step S160, at which the motion detection module 105 turns to acquire the pixel value of each of the pixels of the image block located in the next sub-area of the currently extracted second image.

Those of ordinary skill in the art will appreciate that part of all of the flows implementing the above method embodiments can be accomplished by controlling the relevant hardware using programs. The programs can be stored in a computer-readable storage medium, and, when executed, can encompass the flows of the various method embodiments described above. The storage medium mentioned in the above embodiments may be a non-volatile storage medium such as a magnetic disk, an optical disk, a read-only memory (ROM), etc., or a random access memory (RAM) or the like.

The various technical features of the embodiments described above can be arbitrarily combined. While for brevity of description not all possible combinations of the various technical features set forth in the above embodiments have been described, any such combinations, where no contradiction arises, will be regarded as falling in the scope of this disclosure.

It should be noted that the above embodiments are merely illustrative of the technical solutions of the disclosure and are not restrictive. Although the disclosure has been described in detail in reference to some exemplary embodiments, those of ordinary skill in the art will contemplate various modifications, changes, or equivalent substitutions that are possible to the disclosure without departing from the spirit and scope of the technical solutions disclosed herein.

What is claimed is:

1. A video recording method, comprising:
    extracting a first image captured by a monitoring camera every first predetermined time period;
    performing region detection on the extracted first image using a pre-established model to extract areas of interest covering some or all parts of a target object;
    performing motion area filtering on the extracted areas of interest using an analysis rule to select one or more target areas;
    dividing the selected target areas according to a division rule so that each selected target area is divided into a plurality of sub-areas;
    extracting a second image captured by the monitoring camera every second predetermined time period;
    comparing an image block located in each sub-area of the second image with that in the same sub-area of the previously extracted second image, to determine whether a motion event has occurred in each sub-area; and
    controlling the monitoring camera to start video recording from the currently-extracted second image when a motion event has occurred in a sub-area;
    wherein the pre-established model is a convolutional neural network (CNN) model;
    wherein the CNN model comprises: five convolutional layers configured to extract key features using convolution filters; and a downsampling layer configured to remove repeatedly expressed feature point by sampling;
    wherein the sampling comprises maximum sampling, average sampling, and random sampling.

2. The video recording method according to claim 1, wherein the analysis rule comprises:
    analyzing whether there exists an extracted area of interest that lies within a preset pixel area, the preset pixel area comprising an abscissa range (X1, X2) and an ordinate range (Y1, Y2), where X1 represents pixels in column X1, and X2 represents pixels in column X2, with X1 being less than X2; Y1 represents pixels in row Y1, and Y2 represents pixels in row Y2, with Y1 being less than Y2; and
    when there exists an extracted area of interest that lies within the preset pixel area, determining the area of interest as the target area.

3. The video recording method according to claim 1, wherein the division rule comprises: dividing the selected target areas into sub-areas in a uniform division manner so that each target area is divided into a number of N times N sub-areas, where N is a positive integer greater than 1.

4. The video recording method according to claim 1, wherein the determining whether a motion event has occurred in each sub-area comprises:
    computing a difference value between a pixel value of each pixel of the image block located in each sub-area of the currently-extracted second image and that of a corresponding pixel of the image block located in the same sub-area of the previously-extracted second image;
    summing all the corresponding difference values of the image block in each sub-area and dividing the summation by a number of pixels of the image block to obtain a corresponding average difference value of the image block in each sub-area; and
    when a corresponding average difference value of the image block in a sub-area is greater than a predetermined threshold value, determining that a motion event has occurred in this sub-area.

5. A server comprising a storage device configured to store a video recording system, and a processor;
    wherein the processor is configured to execute the video recording system to perform the following operations:
    extracting a first image captured by a monitoring camera every first predetermined time period;
    performing region detection on the extracted first image using a pre-established model to extract areas of interest covering some or all parts of a target object;
    performing motion area filtering on the extracted areas of interest using an analysis rule to select one or more target areas;
    dividing the selected target areas according to a division rule so that each selected target area is divided into a plurality of sub-areas;
    extracting a second image captured by the monitoring camera every second predetermined time period;
    comparing an image block located in each sub-area of the second image with that in the same sub-area of the previously extracted second image, to determine whether a motion event has occurred in each sub-area; and
    controlling the monitoring camera to start video recording from the currently extracted second image when a motion event has occurred in a sub-area,
    wherein the pre-established model is a convolutional neural network (CNN) model;
    wherein the CNN model comprises: five convolutional layers configured to extract key features using convolution filters; and a downsampling layer configured to remove repeatedly expressed feature point by sampling;
    wherein the sampling comprises maximum sampling, average sampling, and random sampling.

6. The server according to claim 5, wherein the analysis rule comprises:

analyzing whether there exists an extracted area of interest that lies within a preset pixel area, the preset pixel area comprising an abscissa range (X1, X2) and an ordinate range (Y1, Y2); and when there exists an extracted area of interest lying within the preset pixel area, determining the area of interest as the target area.

7. The server according to claim 5, wherein the division rule comprises: dividing the selected target areas into sub-areas in a uniform division manner so that each target area is divided into a number of N times N sub-areas, where N is a positive integer greater than 1.

8. The server according to claim 5, wherein the determining whether a motion event has occurred in each sub-area comprises:

computing a difference value between a pixel value of each pixel of the image block located in each sub-area of the currently extracted second image and that of a corresponding pixel of the image block located in the same sub-area of the previously extracted second image;

adding all the corresponding difference values of the image block in each sub-area and dividing the summation by a number of pixels of the image block to obtain a corresponding average difference value of the image block in each sub-area; and when a corresponding average difference value of the image block in a specific sub-area is greater than a predetermined threshold value, determining that a motion event has occurred in the specific sub-area.

9. A storage medium storing computer-readable instructions, wherein when executed by one or more processors, the computer-readable instructions perform the following operations:

extracting a first image captured by a monitoring camera every first predetermined time period;

performing region detection on the extracted first image using a pre-established model to extract areas of interest covering some or all parts of a target object;

performing motion area filtering on the extracted areas of interest using an analysis rule to select one or more target areas;

dividing the selected target areas according to a division rule so that each target area is divided into a plurality of sub-areas;

extracting a second image captured by the monitoring camera every second predetermined time period;

comparing an image block located in each sub-area of the second image with that in the same sub-area of the previously extracted second image, to determine whether a motion event has occurred in each sub-area; and controlling the monitoring camera to start video recording from the currently extracted second image when a motion event occurs in a sub-area;

wherein the pre-established model is a convolutional neural network (CNN) model;

wherein the CNN model comprises: five convolutional layers configured to extract key features using convolution filters; and a downsampling layer configured to remove repeatedly expressed feature point by sampling;

wherein the sampling comprises maximum sampling, average sampling, and random sampling.

10. The storage medium according to claim 9, wherein the analysis rule comprises:

analyzing whether there exists an extracted area of interest that lies within a preset pixel area, the preset pixel area comprising an abscissa range (X1, X2) and an ordinate range (Y1, Y2), where X1 represents pixels in column X1, and X2 represents pixels in column X2, with X1 being less than X2; Y1 represents pixels in row Y1, and Y2 represents pixels in row Y2, with Y1 being less than Y2; and when there exists an extracted area of interest that lies within the preset pixel area, determining the area of interest as the target area.

11. The storage medium according to claim 9, wherein the division rule comprises: dividing the selected target areas into sub-areas in a uniform division manner so that each target area is divided into a number of N times N sub-areas, where N is a positive integer greater than 1.

12. The storage medium according to claim 9, wherein the determining whether a motion event has occurred in each sub-area comprises:

computing a difference value between a pixel value of each pixel of the image block located in each sub-area of the currently extracted second image and that of a corresponding pixel of the image block located in the same sub-area of the previously extracted second image;

summing all the corresponding difference values of the image block in each sub-area and dividing the summation by a number of pixels of the image block to obtain a corresponding average difference value of the image block in each sub-area; and when a corresponding average difference value of the image block in a sub-area is greater than a predetermined threshold value, determining that a motion event has occurred in this sub-area.

13. The server according to claim 5, wherein the monitoring camera is a network camera.

* * * * *